United States Patent Office 3,549,553
Patented Dec. 22, 1970

3,549,553
METHOD FOR PRODUCING HALOPHOSPHATE PHOSPHOR OF PLATE-LIKE PARTICLE SHAPE
Anselm Wachtel, Parlin, N.J., assignor to Westinghouse Electric Corporation, Pittsburgh, Pa., a corporation of Pennsylvania
No Drawing. Filed Feb. 19, 1968, Ser. No. 706,638
Int. Cl. C09k 1/36
U.S. Cl. 252—301.6                                         7 Claims

ABSTRACT OF THE DISCLOSURE

A halophosphate phosphor of superior particle shape is prepared from a uniformly distributed raw mix in a method utilizing plate-like shaped dicalcium orthophosphate as an essential constituent. The plate-like dicalcium orthophosphate is intimately mixed with the other raw mix constituents. The primary metal additions of calcium, cadmium, and manganese to the raw mix are made by using nitrates of these metals which are soluble in their own water of hydration, or by using a metal carbonate-fluoride mixture which is slurried with the dicalcium orthophosphate. Alternatively the raw mix addition to the dicalcium orthophosphate are all thoroughly ball milled to a particle size of less than about one micron. The final mixture in each case is fired to produce the plate-like, well-formed halophosphate phosphor particles.

BACKGROUND OF THE INVENTION

The halophosphate phosphor used in the fluorescent lamp industry has continued to be improved in both luminescent intensity and in maintenance characteristics. Some of the improvement has been accomplished by improving the crystallinity of the various raw mix constituents used in preparing the phosphor, which have in turn been used to produce a better phosphor. One area which allows for improvement in phosphor production is the so-called "optical particle size" of the phosphor. This is a factor characterizing the scattering and reflectance characteristic of the phosphor. The usual halophosphate phosphor particles are rough, pitted and irregularly shaped. These factors adversely affect the optical particle size.

Significant work has been done toward improving the dicalcium orthophosphate crystal which is now generally used as the major raw mix constituent in preparing calcium halophosphate phosphor. When the dicalcium orthophosphate is mixed with the other solid constituents in the raw mix and fired at a high temperature it is generally observed that the appearance of the resulting calcium halophosphate phosphor bears little resemblance to the well formed plate-like appearance of the dicalcium orthophosphate. It is felt that the rough and pitted phosphor of the prior art results from local high concentration gradients of the various raw mix constituents in contact with the dicalcium orthophosphate during the firing procedure. A more uniform distribution of constituents in the raw mix would minimize such concentration gradients.

SUMMARY OF THE INVENTION

It is an object of this invention to provide a method by which dicalcium orthophosphate and other constituents used in producing calcium halophosphate phosphor are combined in a raw mix having substantially a uniform distribution of constituents to allow production of a superior halophosphate phosphor.

It is a further object of the invention to provide a method of preparing superior calcium halophosphate phosphor having plate-like particles substantially conforming to the shape of the dicalcium orthophosphate utilized in the raw mix in the preparation of the phosphor.

These objects and others that will become apparent as the description proceeds are accomplished by several methods of uniformly distributing the raw mix constituents. In one embodiment, the metallic constituents calcium, cadmium and manganese are supplied to the raw mix as nitrates, which, on heating, are soluble in their own water hydration. The constituents are uniformly distributed as a result of direct decomposition of the nitrates in contact with the dicalcium orthophosphate. The nitrates upon dissolution in their own water of hydration are contained in liquid vehicle and are easily and intimately dispersed with respect to the dicalcium orthophosphate, and upon further heating the nitrates decompose leaving the respective oxides uniformly distributed with the dicalcium orthophosphate. Other more readily volatilizable constituents may be added to the raw mix as solid finely divided compounds prior to firing.

In another embodiment, the constituents are uniformly distributed with the dicalcium orthophosphate again utilizing the nitrates of the metallic constituents. The metallic nitrate constituents are placed in solution and the metallic constituents are precipitated as mixed finely divided carbonate-fluoride. The nitrate in solution is separated, leaving metallic carbonate-fluoride which is then slurried with the dibasic calcium phosphate. The slurry acts as a liquid vehicle allowing for good distribution of the constituents. The slurry is dried providing a raw mix of uniform distribution. Other more readily volatilizable constituents can be added as finely divided solids to complete the raw mix which is fired to produce the calcium halophosphate phosphor.

In yet another embodiment, the raw mix constituents which are difficult to volatilize during the firing are thoroughly ball milled together and then mixed with the dicalcium orthophosphate. The more readily volatilizable constituents are again added before firing the raw mix. The well-crystallized regular plate-like dicalcium orthophosphate is preferably prepared using the homogeneous precipitation technique taught by L. Gordon, M. L. Salutsky and H. H. Willard in "Precipitation From Homogeneous Solution," John Wiley & Sons Inc., 1959.

A batch of the dicalcium orthophosphate can be precipitated from aqueous solution. As an example, 0.1 to 0.2 mole of alkaline-earth oxide is dissolved in sufficient amount of about 0.5 to 2.0 molar concentration of $H_3PO_4$, to which is added 0.5 to 2.0 molar concentration of urea. The mixture is hydrolyzed without stirring to a pH of between 2.5 and 6 for a period of several days, which time depends on the amount and concentration of urea. The well crystallized regular plate-like dicalcium orthophosphate particles precipitate out, and may be separated from the solution. This process for preparing such well crystallized dicalcium orthophosphate, and other techniques which can be used, are summarized in an article surveying alkaline-earth phosphate chemistry, by R. M. Mooney, and M. A. Aia in Chemical Reviews, 61, 433, 1961.

The present invention deals with preserving the crystallinity of the dicalcium orthophosphate while incorporating the activators and firing the raw mix to produce calcium halophosphate phosphor. A batch of dicalcium orthophosphate, also known as dibasic calcium orthophosphate ($CaHPO_4$), as prepared above is used in each of the examples below.

The dicalcium orthophosphate particles used in the practice of the present invention comprise regularly shaped, generally square plates. The material exhibits good crystallinity. In the preferred form, the surfaces of the plate-like particles are smooth, and are about 10–15 microns along the flat sides.

EXAMPLE I

A mixture of the fused nitrates is initially prepared containing 0.584 mole of calcium nitrate, 0.02 mole of cadmium nitrate, and 0.0283 mole of manganese nitrate. The nitrate mixture is added to 10.6 milliliters of 49% hydrofluoric acid solution and 1 mole dicalcium orthophosphate. The resulting mixture is allowed to dry and heated slowly to about 500° C. to dissolve the nitrates in their own water of hydration. This allows the metallic constituents to be uniformly distributed with the dicalcium orthophosphate. The more readily volatilizable compounds antimony oxide and ammonium chloride can then be added to the mixture as finely divided solids, for example about 0.02 mole of antimony oxide and 0.1 mole of ammonium chloride are thoroughly mixed into the raw mix. The resulting mixture is fired in loosely capped silica tubes at about 1150° C. for two hours in a nitrogen atmosphere. The firing procedure is repeated for an additional two hour period. In the above example antimony oxide can alternatively be dissolved in the hydrofluoric acid and included in the original mixture with fused nitrates.

EXAMPLE II

In another embodiment the nitrates in the amount and proportion as indicated in Example I are dissolved in about one liter of water. A solution is prepared by adding about 0.85 mole ammonium carbonate and 0.3 mole ammonium fluoride to about one liter of water. This solution is added to the nitrate acid solution. About one liter of alcohol is mixed with the prepared solution which is filtered and washed, thus separating and removing ammonium nitrate formed by reaction. The resulting wet cake of calcium-carbonate-fluoride, cadmium-carbonate-fluoride, and manganese-carbonate-fluoride is slurried with one mole of dicalcium orthophosphate. The slurry is dried and about 0.02 mole of finely divided antimony oxide and 0.1 mole of ammonium chloride are thoroughly mixed therewith to complete the phosphor raw mix. The raw mix is fired in a loosely capped silica tube at about 1150° C. for about two hours in a nitrogen atmosphere. The firing procedure is again repeated for a two hour period.

EXAMPLE III

In another embodiment the metallic constituents calcium, cadmium and manganese as carbonates and fluorides are dispersed by thorough ball milling, after which the dicalcium orthophosphate is mixed in without disturbing the particle size of the phosphate. For example, 1.75 mole of $CaCO_3$, 0.45 mole of $CaF_2$, 0.085 mole of $MnCO_3$, 0.06 mole of $Sb_2O_3$, 0.06 mole of $CdCO_3$, and 0.3 mole of $NH_4Cl$ are thoroughly ball milled for a sufficient time to achieve a mixture with a particle distribution such that the largest particles are about one micron in diameter.

This uniformly distributed mixture is then mixed with 3 moles of the well-formed dicalcium orthophosphate as described above to provide a uniformly distributed raw mix which is then fired in covered silica tubes at about 1150° C., for two hours in a nitrogen atmosphere, to form calcium halophosphate phosphor composition.

In the embodiment of Example III a wet ball milling technique can also be employed and the more readily volatilizable constituents $Sb_2O_2$, and $NH_4Cl$ are not milled with the other constituents but are preferably added to the raw mix just before firing. Also in this example while a raw mix particle size was specified, as small a particle size as is practical is desired, but the specified particle distribution achieves the desired uniform distribution and halophosphate particle shape.

The calcium halophosphate phosphor particles prepared in the above examples are observed to have a plate-like configuration which substantially conforms to that of the dicalcium orthophosphate utilized in the raw mix. The phosphor particles are about 10–15 microns along a side. This uniform plate-like shape is to be contrasted with the irregular pitted shape of prior art halophosphate phosphors.

It will be recognized that applicant has provided a method of preparing superior calcium halophosphate phosphor with a particle shape which substantially conforms to the plate-like regular shape of the dicalcium orthophosphate utilized in the raw mix. The improved halophosphate particle of the present invention is a general improvement over the rough, irregular halophosphate particle of the prior art.

While the invention has been described in specific examples utilizing specific concentrations and ratios of materials it is to be understood that the invention is not to be limited thereto or thereby.

I claim as my invention:

1. The method of preparing calcium halophosphate phosphor comprising individual particles which have good crystallinity and a regular plate-like configuration, which method comprises:
    (a) preparing finely divided dicalcium orthophosphate comprising individual particles having a regular plate-like configuration substantially as desired in said phosphor and measuring about 10 to 15 microns across the plate-like sides thereof;
    (b) intimately mixing with said dicalcium orthophosphate selected raw-mix constituents in such relative proportions as required to form said phosphor, said selected raw-mix constituents being (1) either contained in liquid vehicle so as to effect a uniform contact with said dicalcium orthophosphate particles throughout the surfaces thereof, with the resulting mix then heated to remove liquid therefrom or (2) said selected raw-mix constituents being in an extremely fine state of division of a particle size of less than about one micron to effect substantially uniform contact between said very fine selected raw-mix constituents and all surfaces of said dicalcium orthophosphate particles;
    (c) adding any required additional readily volatilizable raw-mix constituents in such proportion as needed to complete the raw mix required to form said phosphor,
    (d) firing the resulting mixture under predetermined conditions as required to form said phosphor.

2. The method as specified in claim 1, wherein a portion of said selected raw-mix constituents are initially supplied as nitrates which are soluble in their own water of hydration upon heating, and said nitrates are heated to form an aqueous solution thereof to uniformly contact said dicalcium orthophosphate particles.

3. The method as specified in claim 1, wherein a portion of said selected raw-mix constituents are supplied as nitrates which are dissolved in water, mixed with ammonium carbonate and soluble fluorine-containing compound, and said raw-mix constituents are separated from soluble products as carbonate-fluoride mixture and slurried with said dicalcium orthophosphate.

4. The method as specified in claim 1, wherein said selected raw mix constituents are thoroughly ball milled to a particle size of less than about one micron and are thoroughly admixed with said dicalcium orthophosphate.

5. The method as specified in claim 1, wherein the metallic components of said selected raw mix constituents are calcium, cadmium, and manganese.

6. The method of preparing calcium halophosphate phosphor comprising individual particles which have good crystallinity and a regular plate-like configuration, which method comprises:
    (a) preparing finely divided dicalcium orthophosphate comprising individual particles having a regular plate-like configuration substantially as desired in said phosphor;
    (b) intimately mixing with said dicalcium orthophosphate selected metallic raw-mix constituents in such relative proportions as required to form said phosphor, with said constituents being supplied as metal nitrates which are soluble in their own water of hydration upon heating, and heating the mixed dicalcium orthophosphate and nitrate compounds whereby said nitrates form an aqueous solution to uniformly contact said dicalcium orthophosphate particles;

(c) adding any required additional readily volatilizable raw-mix constituents in such proportion as required to complete the raw mix required to form said phosphor;

(d) firing the resulting mixture under predetermined conditions as required to form said phosphor.

7. The method of preparing calcium halophosphate phosphor comprising individual particles which have good crystallinity and a regular plate-like configuration, which method comprises:

(a) preparing finely divided dicalcium orthophosphate comprising individual particles having a regular plate-like configuration substantially as desired in said phosphor;

(b) dissolving phosphor metallic constituents as selected metallic nitrates in water, and admixing with ammonium carbonate and soluble fluorine-containing compound, whereby a precipitate of metallic carbonate-fluoride is precipitated;

(c) slurrying said dicalcium orthophosphate with said metallic carbonate-fluoride in such relative proportions as required to form said phosphor, to effect uniform contact of said dicalcium orthophosphate with said metallic carbonate-fluoride, and separating these phosphor raw-mix constituents from the slurry vehicle;

(d) adding any required additional readily volatilizable raw-mix constituents in such proportion as required to complete the raw mix required to form said phosphor;

(e) firing the resulting mixture under predetermined conditions as required to form said phosphor.

References Cited

UNITED STATES PATENTS 3,242,369   3/1966   King et al. _____ 252—301.4P

TOBIAS E. LEVOW, Primary Examiner

R. D. EDMONDS, Assistant Examiner

U.S. Cl. X.R.

252—301.4